United States Patent
Batchu

(10) Patent No.: US 11,514,025 B2
(45) Date of Patent: *Nov. 29, 2022

(54) SNAPSHOT CONSCIOUS INTERNAL FILE DATA MODIFICATION FOR NETWORK-ATTACHED STORAGE

(71) Applicant: EMC IP HOLDING COMPANY LLC, Hopkinton, MA (US)

(72) Inventor: Ravi V. Batchu, Cupertino, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 434 days.

This patent is subject to a terminal disclaimer.

(21) Appl. No.: 16/544,785

(22) Filed: Aug. 19, 2019

(65) Prior Publication Data

US 2019/0370249 A1 Dec. 5, 2019

Related U.S. Application Data

(63) Continuation of application No. 14/788,016, filed on Jun. 30, 2015, now Pat. No. 10,452,641.

(51) Int. Cl.
*G06F 16/23* (2019.01)
*G06F 16/11* (2019.01)
*G06F 16/2455* (2019.01)

(52) U.S. Cl.
CPC ........ *G06F 16/2365* (2019.01); *G06F 16/113* (2019.01); *G06F 16/116* (2019.01); *G06F 16/128* (2019.01); *G06F 16/24565* (2019.01)

(58) Field of Classification Search
CPC ........... G06F 16/2365; G06F 16/24565; G06F 16/113; G06F 16/116; G06F 16/128

USPC ......................................................... 707/693
See application file for complete search history.

(56) References Cited

U.S. PATENT DOCUMENTS

| | | | |
|---|---|---|---|
| 9,244,967 B2 * | 1/2016 | Provenzano | G06F 16/185 |
| 9,563,683 B2 * | 2/2017 | Abercrombie | G06F 16/137 |
| 2013/0212074 A1 * | 8/2013 | Romanski | G06F 12/0253 |
| | | | 707/692 |
| 2014/0181021 A1 * | 6/2014 | Montulli | G06F 16/178 |
| | | | 707/624 |
| 2014/0181034 A1 * | 6/2014 | Harrison | G06F 16/27 |
| | | | 707/646 |

(Continued)

OTHER PUBLICATIONS

Office Action dated Oct. 18, 2017 for U.S. Appl. No. 14/788,016, 29 pages.

(Continued)

*Primary Examiner* — Hosain T Alam
*Assistant Examiner* — Saba Ahmed
(74) *Attorney, Agent, or Firm* — Amin, Turocy & Watson, LLP

(57) ABSTRACT

Performing snapshot conscious internal file modification for network-attached storage is presented herein. A file system can comprise a first component configured to modify, during a service request, storage for a subset of data blocks of a file—the service request not being recognized by an external entity as a change of content of the file. Further, the file system can comprise a second component configured to prevent, based on the service request, a copy of the storage from being created for servicing of a snapshot—the snapshot comprising a point-in-time copy of the file system.

20 Claims, 12 Drawing Sheets

(56) References Cited

U.S. PATENT DOCUMENTS

2014/0181041 A1* 6/2014 Whitehead .......... G06F 11/1469
707/652
2016/0210306 A1* 7/2016 Kumarasamy ........ G06F 16/178

OTHER PUBLICATIONS

Office Action dated Jun. 12, 2018 for U.S. Appl. No. 14/788,016, 27 pages.
Office Action dated Feb. 8, 2019 for U.S. Appl. No. 14/788,016, 32 pages.

\* cited by examiner

SNAPSHOT CONSCIOUS INTERNAL FILE DATA MODIFICATION FOR NETWORK-ATTACHED STORAGE

RELATED APPLICATION

The subject patent application is a continuation of, and claims priority to, U.S. patent application Ser. No. 14/788,016, filed Jun. 30, 2015, and entitled "SNAPSHOT CONSCIOUS INTERNAL FILE DATA MODIFICATION FOR NETWORK-ATTACHED STORAGE," the entirety of which application is hereby incorporated by reference herein.

TECHNICAL FIELD

The subject disclosure generally relates to embodiments for performing snapshot conscious internal file modification for network-attached storage (NAS).

BACKGROUND

Conventional NAS-based technologies utilize compression, data archival, etc. to increase density of data stored in a network. Further, such technologies utilize snapshots to record the state of a file system at a particular point in time for data recovery. In this regard, conventional snapshot technologies do not distinguish internal file data modifications that change the way data is stored internally, i.e., during compression data services, archival data services, etc. from externally requested data changes, and consequently create another copy of such data for servicing a snapshot. For example, if x bytes of data are compressed by 40% to obtain 0.6x bytes of compressed data, when the file system subsequently frees, removes, etc. the x bytes of uncompressed data, such removal will, in a predominantly common case, result in a copy of the x bytes for servicing of a snapshot—resulting in a total of 1.6x bytes of data being consumed in the file system. Consequently, such technologies have had some drawbacks with respect to utilizing storage space in an efficient manner, leaving much room for improvement.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
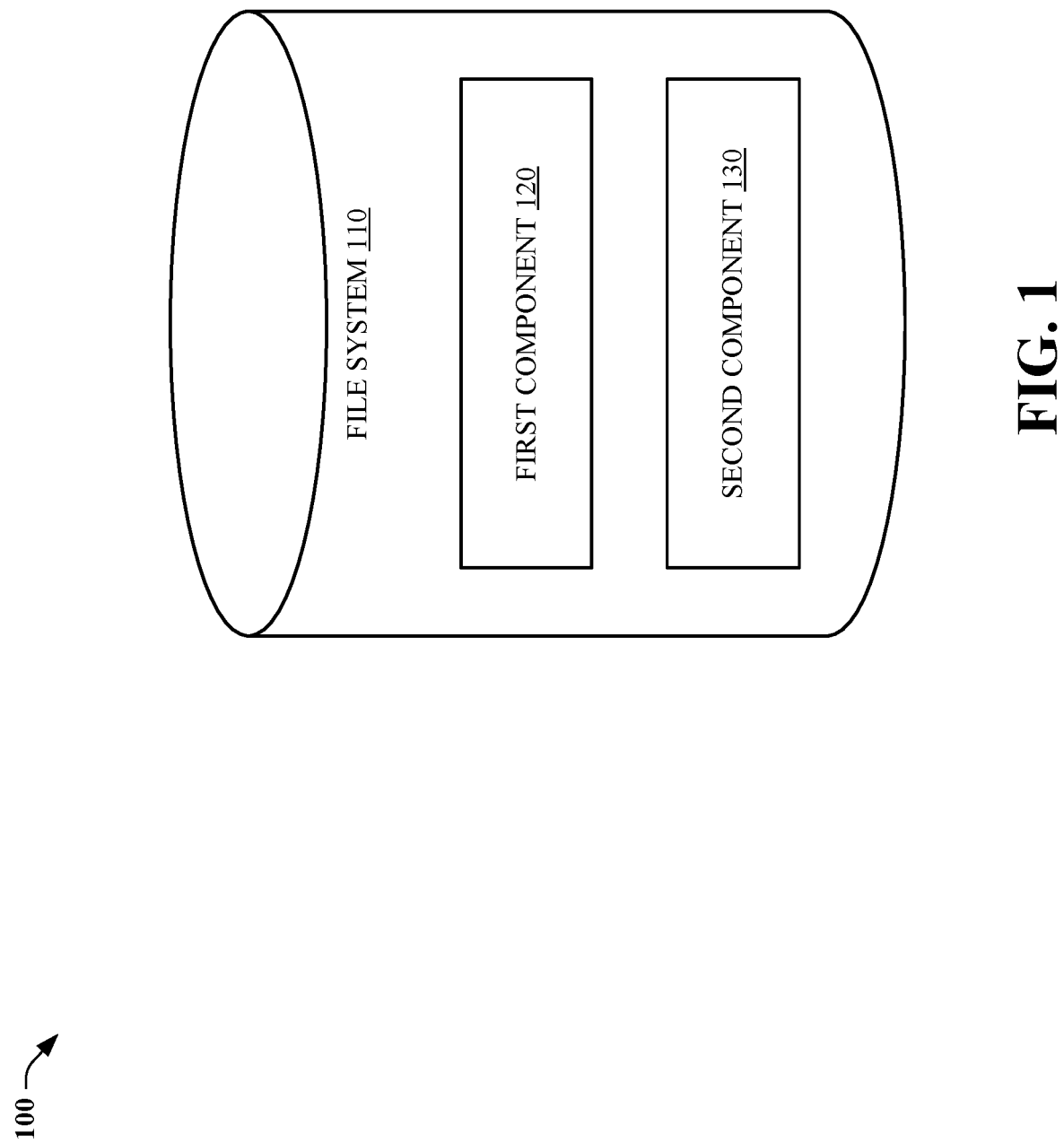
FIG. 1 illustrates a block diagram of a file system for performing snapshot conscious internal file modification, in accordance with various embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, an issue with existing NAS technologies is that internal file data modifications do not interoperate with snapshot technologies. An internal file data modification changes the way file data is stored internally, without changing content of the file data as seen by an external entity, e.g., external to a corresponding NAS system. Compression and archival are examples of data services that perform internal file data modifications. In the case of compression, e.g., for servicing a request by the external entity to read a file, a storage server decompresses compressed data and provides uncompressed data to the external entity. In the case of archival, e.g., for servicing of the request, the storage server retrieves archived data from an archival device, (which could be a storage server, tape storage, cloud-based storage, etc.) and provides such data to the external entity. In this regard, although compression and archival operations change the way data is stored internally, such operations do not change content of the data as seen by the external entity.

In this regard, as described above, conventional NAS-based technologies do not distinguish internally generated, system generated, etc. requests to delete uncompressed data from externally generated requests to modify data—such technologies preserve a copy of the deleted data for servicing a snapshot, which defeats the purpose of performing compression to save space. Further, conventional NAS-based snapshot technologies suffer from similar drawbacks with respect to data archival, in which an internally requested freeing up of original data that has been archived is handled in the same way as an externally requested data change event, and, consequently, a copy of the original data is preserved during a snapshot.

On the other hand, various embodiments disclosed herein can improve storage efficiency by distinguishing, e.g., during snapshot operations, internally requested data modifications, changes, etc. associated with, e.g., data compression, data archival, etc. from externally requested changes of data.

For example, a file system can comprise a processor, coupled to a memory, that executes or facilitates execution of executable components, comprising: a first component configured to modify (e.g., remove, delete, etc), during a service request, storage for a subset of data blocks of a file—the service request not being recognized by an external entity as a change of content, data, etc. of the file. Further, the file system can comprise a second component configured to prevent, based on the service request, a copy of the storage from being created for servicing a snapshot. In this regards, for example, when the file system compresses x bytes of data to obtain 0.6x bytes of compressed data, only 0.6x bytes of data are created for servicing the snapshot. In this regard, a request for reading the x bytes from the snapshot version of the file is serviced by the file system by decompressing the compressed 0.6x bytes.

In an embodiment, the first component can be configured to determine a timestamp of the file representing a time that the file was last modified. After the timestamp has been determined, the first component can iteratively compress the data blocks of the file to generate compressed data blocks. Further, after generation of the compressed data blocks, the first component can obtain an exclusive lock on the file to prevent an access, e.g., a read or write access of the file, data blocks of the file, etc. by another process.

Furthermore, the second component can be configured to determine, after the exclusive lock on the file has been obtained, whether the timestamp of the file has changed, was modified, etc., e.g., due to modification of the data blocks by another process. In this regard, in an embodiment, in response to a determination that the timestamp of the file has changed, the second component can release the exclusive lock on the file, and the first component can re-compress the data blocks of the file to re-generate the compressed blocks.

In another embodiment, after the exclusive lock on the file has been obtained, and in response to a determination that the timestamp of the file has not changed, e.g., in response to a determination that the data blocks have not been modified, the second component can generate a temporary inode referencing the storage. Further, the second component can convert an original inode referencing the storage into an inode stub referencing another storage for the compressed data blocks. In an embodiment, the second component can convert the original inode into the inode stub by setting a value, bit value, etc. of the original inode indicating the original inode is the inode stub.

In one embodiment, the first component can be configured to generate the compressed data blocks by iteratively: obtaining a shared lock on the file to prevent a write of data to the file, e.g., to prevent a modification of the data blocks during the shared lock; reading a set, next set, next portion, "chunk", etc. of the data blocks during the shared lock; release the shared lock to permit data writes to the file; compress the next set of the data blocks to obtain compressed data blocks; and store the compressed data blocks in the other storage.

In another embodiment, the second component can further be configured to release, after converting the original inode into the inode stub, the exclusive lock on the file. Further, after releasing the exclusive lock on the file, the second component can be configured to free the storage and remove the temporary inode.

In an embodiment, the second component does not include the temporary inode in a directory tree of the file system. Thus, the temporary inode, and the data blocks referenced by the temporary inode, are not governed by snapshots since the temporary inode is not associated with a parent directory, e.g., of the directory tree. In this regard, a process that is freeing, deleting, etc. the data blocks will not find a governing snapshot for the temporary inode because the temporary inode is not associated with a parent directory.

In another embodiment, the first component is further configured to select the file for compression in response to a determination that the timestamp satisfies a defined condition with respect to the time that the file was last modified, e.g., such condition indicating that the file is not an active file, has not been actively modified over a defined period of time, etc.

In yet another embodiment, the original inode contains a root address of a b-tree referencing block addresses of the data blocks of the file. In an embodiment, the inode stub contains a root address of a b-tree referencing block addresses of the compressed data blocks.

In one embodiment, a method can comprise modifying, by a file system comprising a processor, storage for a subset of data blocks of a file of the file system—such modifying of the storage not being recognized by an external entity as a change of content of the file. Further, the method can include preventing, by the file system in response to the modifying of the storage, a copy of the storage from being created for servicing of a snapshot.

In another embodiment, the modifying of the storage comprises determining a timestamp representing a time that the file was last modified. Further, in response to the determining of the timestamp, the modifying of the storage can comprise compressing the data blocks of the file to obtain compressed data blocks, and in response to the compressing of the data blocks, acquiring an exclusive lock on the file for preventing access of the file by another process.

In yet another embodiment, the preventing of the copy of the storage from being created for servicing of the snapshot can comprise: in response to the acquiring of the exclusive lock, and in response to determining that the timestamp has not changed, creating a temporary index node referencing the storage, and converting an original index node referencing the storage into an index node stub referencing another storage for the compressed data blocks—the temporary index node and the data blocks not being governed by a snapshot comprising a point-in-time copy of the file system.

In an embodiment, the method can further comprise releasing, by the file system, the exclusive lock on the file after converting the original index node into the index node stub. Further, the method can comprise deleting, by the file system, the temporary index node and freeing the storage in response to the releasing of the exclusive lock on the file.

In one embodiment, the method can further comprise not including, by the file system, the temporary inode in a directory tree of the file system. Thus, the temporary inode, and the data blocks referenced by the temporary inode, are not governed by a snapshot since the temporary inode is not associated with a parent directory, e.g., of the directory tree. In this regard, a process that is freeing, deleting, etc. the data blocks will not find a governing snapshot for the temporary inode because the temporary inode is not associated with a parent directory.

In another embodiment, the modifying of the storage can comprise compressing the data blocks of the file to obtain the compressed data blocks in response to determining that the timestamp satisfies a defined condition with respect to the time that the file was last modified, e.g., the defined condition indicating that the file is not an active file, has not been actively modified over a defined period of time, etc.

In an embodiment, the compressing of the data blocks can comprise obtaining a shared lock on the file to prevent a modification of the data blocks of the file; in response to the obtaining of the shared lock, reading a set, next set, etc. of the data blocks; in response to the reading of the set, next set, etc. of the data blocks, releasing the shared lock on the file to permit the modification of the data blocks of the file; in response to the releasing of the shared lock, compressing the set, next set, etc. of the data blocks to obtain a portion, set, etc. of the compressed data blocks; and storing the portion, set, etc. of the compressed data blocks in the other storage.

In one embodiment, the method can comprise releasing, by the file system, the exclusive lock on the file and re-compressing the data blocks in response to determining that the timestamp has changed, e.g., due to modification of the data by another process.

One embodiment can comprise a computer-readable storage device having stored thereon executable instructions that, in response to execution, cause a device comprising a processor to perform operations, the operations comprising: modifying storage for a set of data blocks of a file of a file system—the modifying of the storage not being recognized by an external entity as a change of content of the file; and in response to the modifying of the storage, preventing a copy of the storage from being created for servicing of a snapshot.

In another embodiment, the modifying of the storage comprises determining a timestamp of the file; in response to the determining of the timestamp, iteratively compressing the data blocks of the file to generate compressed data blocks; and in response to the iteratively compressing of the data blocks, obtaining an exclusive lock on the file to prevent an access of the file by another process.

In yet another embodiment, the preventing of the copy from being created comprises: in response to the obtaining of the exclusive lock on the file, and in response to determining that the timestamp has not changed, creating a temporary inode referencing the storage, and converting an original inode referencing the storage into an inode stub referencing another storage for the compressed data blocks—the temporary inode and the data blocks not being governed by the snapshot.

In another embodiment, the operations can further comprise releasing the exclusive lock on the file in response to the converting of the original inode, and removing the temporary inode and freeing the storage in response to the releasing of the exclusive lock. In yet another embodiment, the operations can further comprise not including the temporary inode in a directory tree of the file system. Thus, the temporary inode, and the data blocks referenced by the temporary inode, are not governed by the snapshot.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, terms "component," "function", "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to, magnetic storage devices, e.g., hard disk; floppy disk; magnetic strip(s); optical disk (e.g., compact disk (CD), digital video disc (DVD), Blu-ray Disc (BD)); smart card(s); and flash memory device(s) (e.g., card, stick, key drive); and/or a virtual device that emulates a storage device and/or any of the above computer-readable media.

In accordance with various embodiments, processor(s) for implementing embodiments disclosed herein can comprise distributed processing devices, or parallel processing devices, in a single machine, device, etc., or across multiple machines, devices, etc. Furthermore, the processor(s) can comprise a state machine, an application specific integrated circuit (ASIC), or a programmable gate array (PGA), e.g., field PGA (FPGA). In this regard, when the processor(s) execute instruction(s) to perform "operations", the processor(s) can perform the operations directly, and/or facilitate, direct, or cooperate with other device(s) and/or component(s) to perform the operations.

In accordance with various aspects of the subject specification, artificial intelligence based systems, components, etc. can employ classifier(s) that are explicitly trained, e.g., via a generic training data, as well as implicitly trained, e.g., via observing characteristics of communication equipment, e.g., a network device, a gateway, a wireless communication device, etc., by receiving reports from such communication equipment, by receiving operator preferences, by receiving historical information, by receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by file system 110 (see below), comprising, but not limited to, modifying, during a service request, storage for a subset of data blocks of a file—the service request not being recognized by an external entity as a change of content of the file—and preventing, based on the service request, a copy of the storage from being created for servicing a snapshot.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

For example, the classifier(s) can be used by the artificial intelligence system, e.g., file system 110 (see below), to automatically obtain an exclusive lock on a file to prevent an access of the file by another process, and in response to determining that a timestamp of the file has not changed: create a temporary inode referencing the storage—the temporary inode and the data blocks not being governed by a snapshot comprising a point-in-time copy of a file system comprising the file—and convert an original inode referencing the storage into an inode stub referencing another storage for the compressed data blocks.

As used herein, the term "infer" or "inference" refers generally to the process of reasoning about, or inferring states of, the system, environment, user, and/or intent from a set of observations as captured via events and/or data. Captured data and events can comprise user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As utilized herein, the terms "logic," "logical," "logically," and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Figure 2:
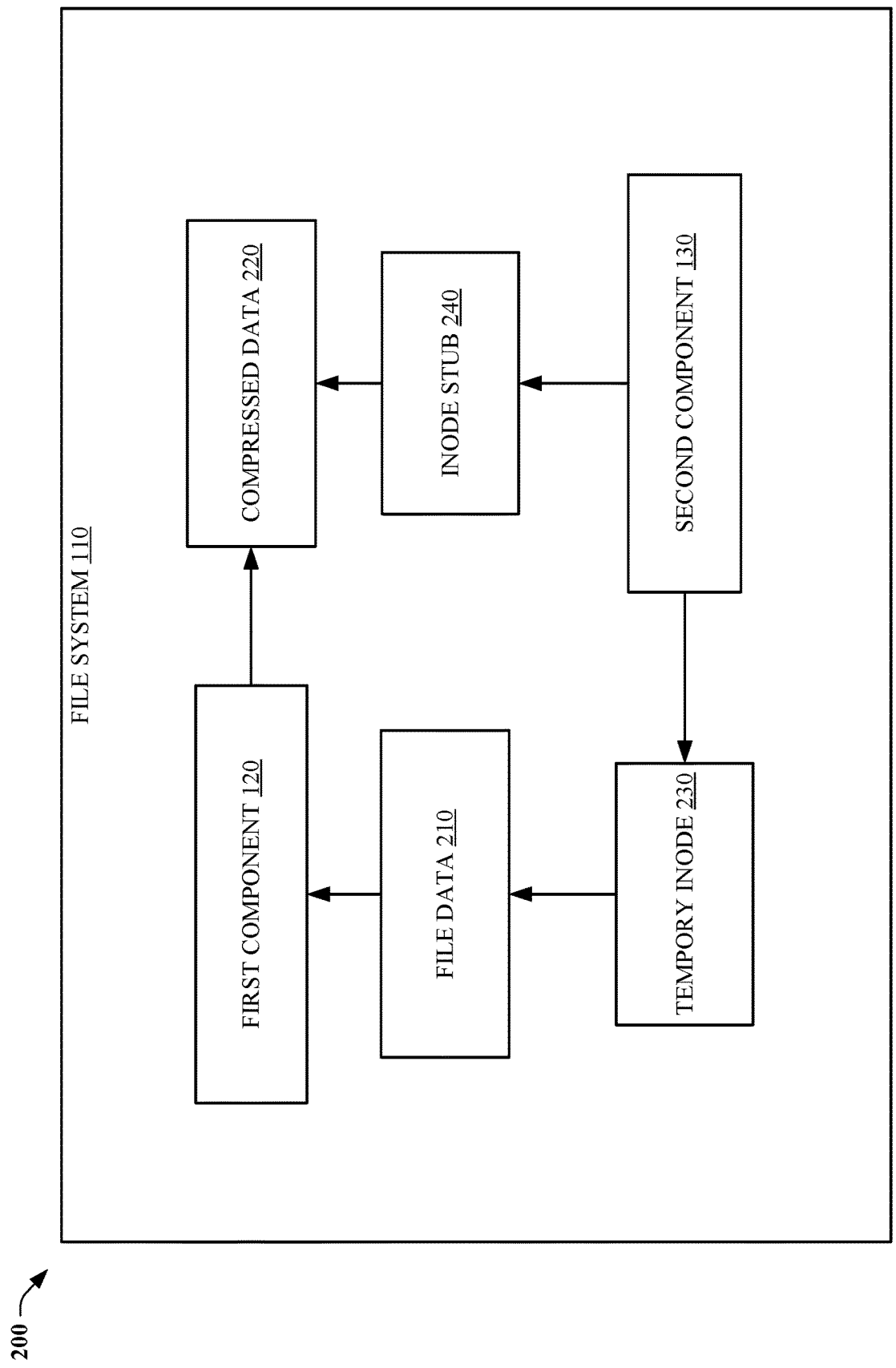
FIG. 2 illustrates another block diagram of the file system for performing snapshot conscious internal file modification, in accordance with various embodiments.
Figure 3:
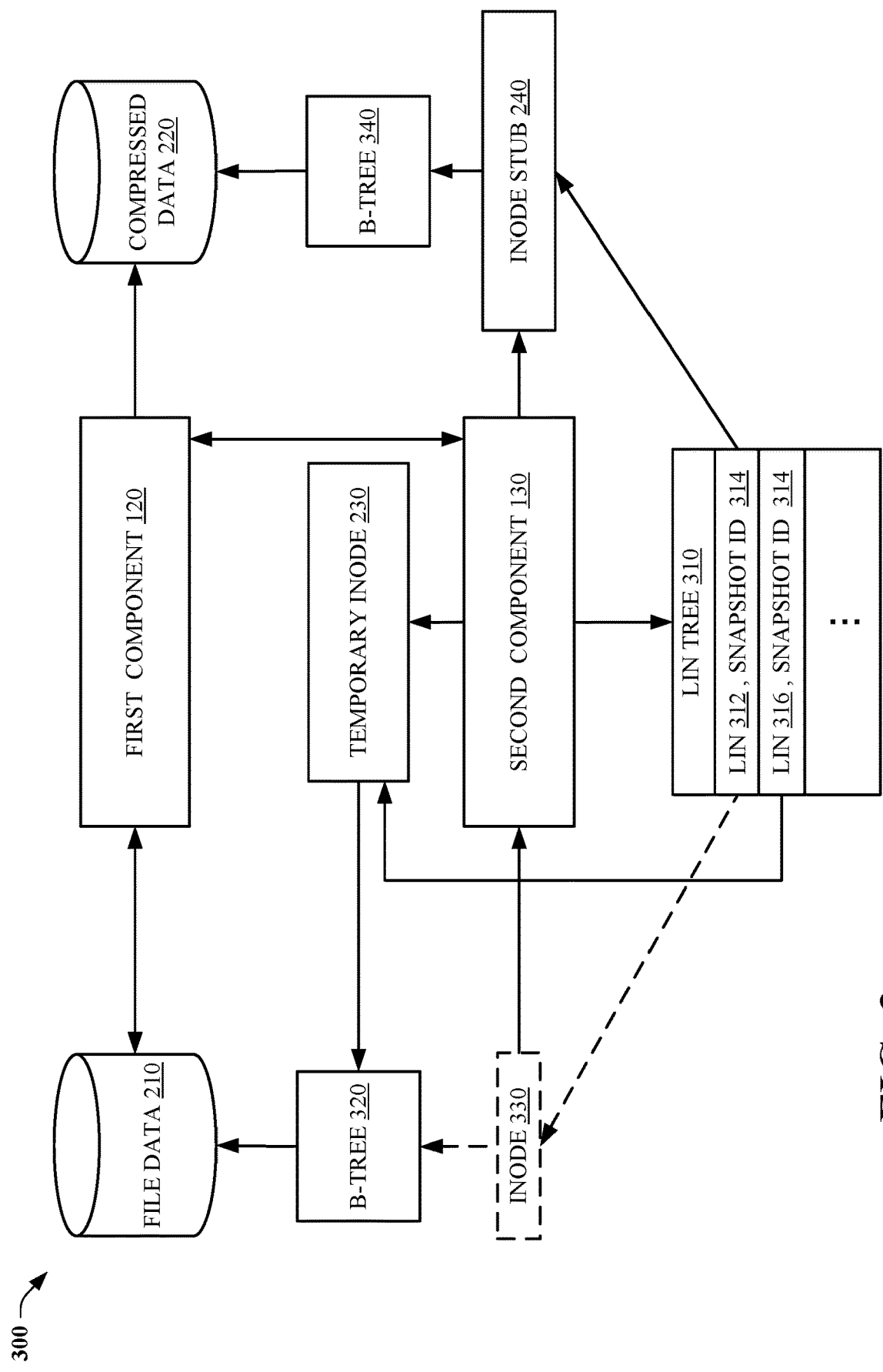
FIG. 3 illustrates yet another block diagram of the file system for performing snapshot conscious internal file modification, in accordance with various embodiments.

Now referring to FIGS. 1-3, block diagrams (100, 200, 300) of file system 110 for performing snapshot conscious internal file modifications are illustrated, in accordance with various embodiments. As illustrated by FIG. 1, file system 110 can include first component 120 and second component 130. First component 120 can be configured to modify, e.g., delete, free, remove, etc. during a service request, storage for a subset of data blocks of a file (e.g., file data 210)—the service request not being recognized by an external entity as a change of content of the file. Further, second component 130 can be configured to prevent, based on the service request, a copy of the storage from being created for servicing a snapshot.

In an embodiment, first component 120 can determine a timestamp of the file representing a time that the file was last modified. Further, after the timestamp has been determined, first component 120 can iteratively compress the data blocks of the file to generate compressed data blocks (e.g. compressed data 220).

In this regard, in one embodiment, first component 120 can iteratively: obtain a shared lock on the file to prevent a write of data to the file, e.g., to prevent a modification of the data blocks during the shared lock; read a set, a portion, etc. of the data blocks during the shared lock; release the shared lock to permit the write of the data to the file; compress the set of the data blocks to obtain a set of the compressed data blocks; and store the set of the compressed data blocks in the other storage—repeating the above steps for each set, or portion, of the data blocks.

After generation of the compressed data blocks, first component 120 can obtain an exclusive lock on the file to prevent an access of the file by another process. Further, second component 130 can be configured to determine, after the exclusive lock on the file has been obtained, whether the timestamp of the file has changed, was modified, etc., e.g., due to a modification of the data blocks by another process. In this regard, in an embodiment, in response to a determination that the timestamp of the file has changed, second component 130 can release the exclusive lock on the file, and first component 120 can re-compress the data blocks of the file to re-generate the compressed blocks.

In another embodiment, after the exclusive lock on the file has been obtained, and in response to a determination that the timestamp of the file has not changed, second component 130 can generate temporary inode 230 referencing the storage, e.g., temporary inode 230 containing, comprising, etc. a root address of b-tree 320 that references block addresses of the data blocks of the file, e.g., file data 210. In this regard, temporary inode 230, and the data blocks referenced by temporary inode 230, are not governed by a snapshot comprising a point-in-time copy of file system 110.

In an embodiment, second component 130 does not include temporary inode 230 in a directory tree (not shown) of file system 110. In this regard, temporary inode 230, and the data blocks of the file that have been referenced by temporary inode 230, are not governed by the snapshot, e.g., since temporary inode 230 is not associated with a parent directory (not shown) of the directory tree. Thus, a process that is freeing, deleting, etc. the data blocks will not find a governing snapshot for temporary inode 230 because temporary inode 230 is not associated with the parent directory.

After the exclusive lock on the file has been obtained, and in response to the determination that the timestamp of the file has not changed, second component 130 can convert an original inode, e.g., inode 330, referencing the storage into inode stub 240, which references the other storage for the compressed data blocks, e.g., inode stub 240 containing, comprising, etc. a root address of b-tree 340 that references block addresses of the compressed data blocks (e.g., compressed data 220) of the file. In an embodiment, second component 130 can convert the original inode into inode stub 240 by setting a value, bit value, etc. of the original inode indicating the original inode is inode stub 240.

FIG. 3 illustrates a logical inode number (LIN) tree 310, which is a type of b-tree data structure that stores addresses for each inode data structure, or inode version (e.g., 330)) corresponding to a snapshot. In this regard, in response to a process of file system 110 detecting a request to modify the file, determining that there is a governing snapshot by, in one embodiment, walking up the directory tree by repetitively returning to the parent directory to see whether the file is externally visible, and determining such request is the first to be detected after a snapshot has been performed on file system 110, the process can create a new inode representing a snapshot version of the file data that is about to be changed, and perform a copy-on-write that stores such file data within file system 110. In this regard, the process can place information representing the location of the stored file data in the new inode, and place the address of the new inode in LIN tree 310—the address of the new inode comprising a LIN (e.g., 312, 316) and a snapshot identification (ID) (e.g., 314) to reference a snapshot version, or version, of the file.

A snapshot based process can retrieve the file data for the snapshot version of the file by retrieving the address of the new inode from LIN tree 310. In this regard, the live, or current, version of the file is referred to as HEAD, and is assigned a maximum possible value, e.g., obtained by setting all bits in the snapshot ID to 1, e.g., representing a two's complement value=−1. Subsequent changes of the file are stored in respective snapshots, or snapshot versions—with snapshot IDs starting at 0 and monotonically increasing with respective changes to the file. In order to reconstruct data of a file from a particular snapshot, snapshot versions of the file are iteratively processed, using the LIN tree, until the HEAD (or live, current, etc.) version, of the file is reached. In this regard, all changes made to the file from the HEAD version are systematically determined to 'paint' a point-in-time view of the dataset of the file. Each inode version of the file is similar to the HEAD version, but comprises a root address of a b-tree of the version of file having addresses, pointers, etc. of blocks, data blocks, etc. (e.g. 8 kilobytes blocks) that have changed—the data blocks containing a read-only copy of the file at a point-in-time corresponding to the snapshot.

In one embodiment, after converting the original inode (e.g., inode 330) into inode stub 240, second component 130 can be configured to release the exclusive lock on the file, free the storage, and remove, delete, etc. temporary inode 230. In this regard, when an in-memory reference count on temporary inode 230 (which is incremented as part of the allocation of temporary inode 230) is dropped (e.g., to 0) within file system 110, temporary inode 230 and the storage are freed.

Further, as described above, a process, e.g., associated with second component 130 freeing the storage, will not find a governing snapshot for temporary inode 230 since temporary inode 230 is not associated with a parent directory of a directory tree (not shown) of file system 110.

In another embodiment, first component 120 is further configured to select the file for compression in response to a determination that the timestamp satisfies a defined condition with respect to the time that the file was last modified, e.g., such condition indicating that the file is not an active file, has not been actively modified over a defined period of time, etc.

In an embodiment, file system 110 can comprise a parallel distributed networked file system, e.g., OneFS™ file system provided by EMC Isilon Systems. In this regard, the parallel distributed networked file system is a type of clustered file system that spreads data across multiple storage nodes, e.g., usually for redundancy or performance. Further, such clustered file system can simultaneously be mounted on multiple file servers (not shown), e.g., OneFS™ clusters, and can provide features like location-independent addressing and redundancy which can improve reliability and/or reduce the complexity of portion(s) of a cluster.

FIGS. 4-11 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 4:
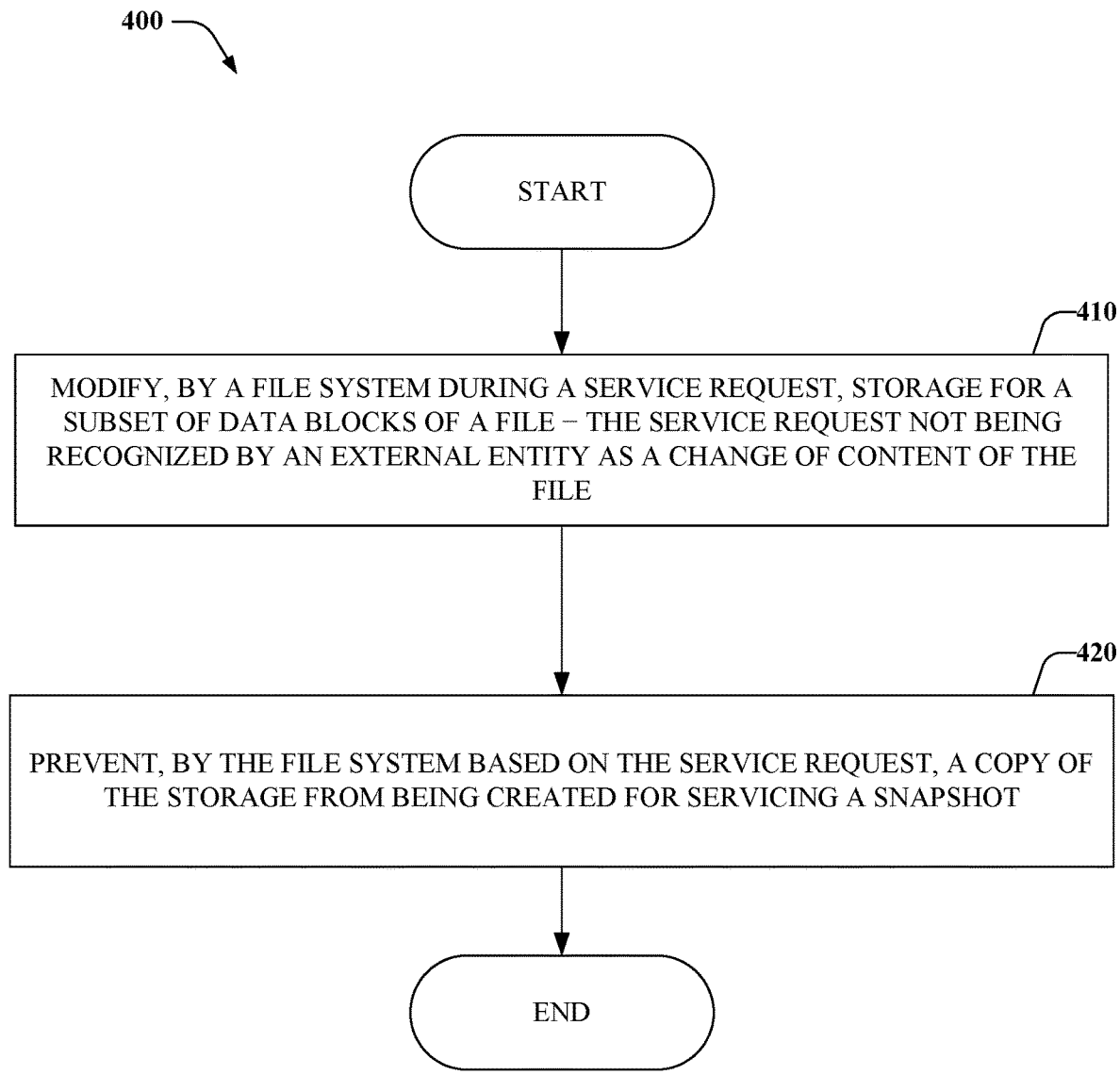
FIG. 4 illustrates a flowchart of a method associated with a file system for performing snapshot conscious internal file modification, in accordance with various embodiments.

FIG. 4 illustrates process 400 performed by file system 110, in accordance with various embodiments. At 410, storage for a subset of data blocks of a file can be modified, e.g., freed, deleted, etc. during a service request. At 420, a copy of the storage can be prevented, based on the service request, from being created for servicing a snapshot. In this regard, in an embodiment (not shown), the copy of the storage can be prevented by creating an inode that represents the storage and not including the inode in the directory tree of the file system.

Figure 5:
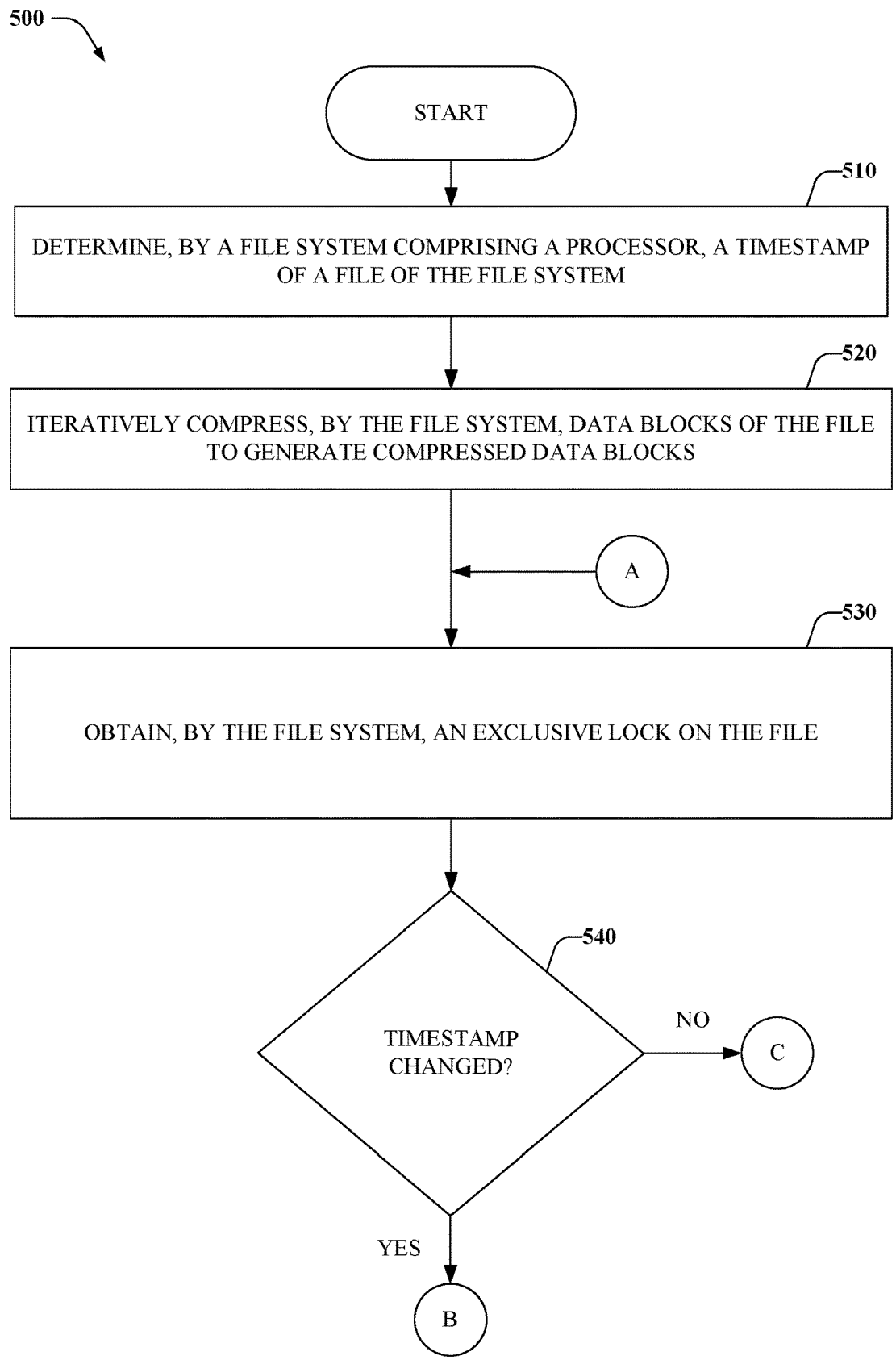
FIGS. 5-7 illustrate flowcharts of a method associated with a file system for performing snapshot conscious internal file modification, in accordance with various embodiments.
Figure 6:
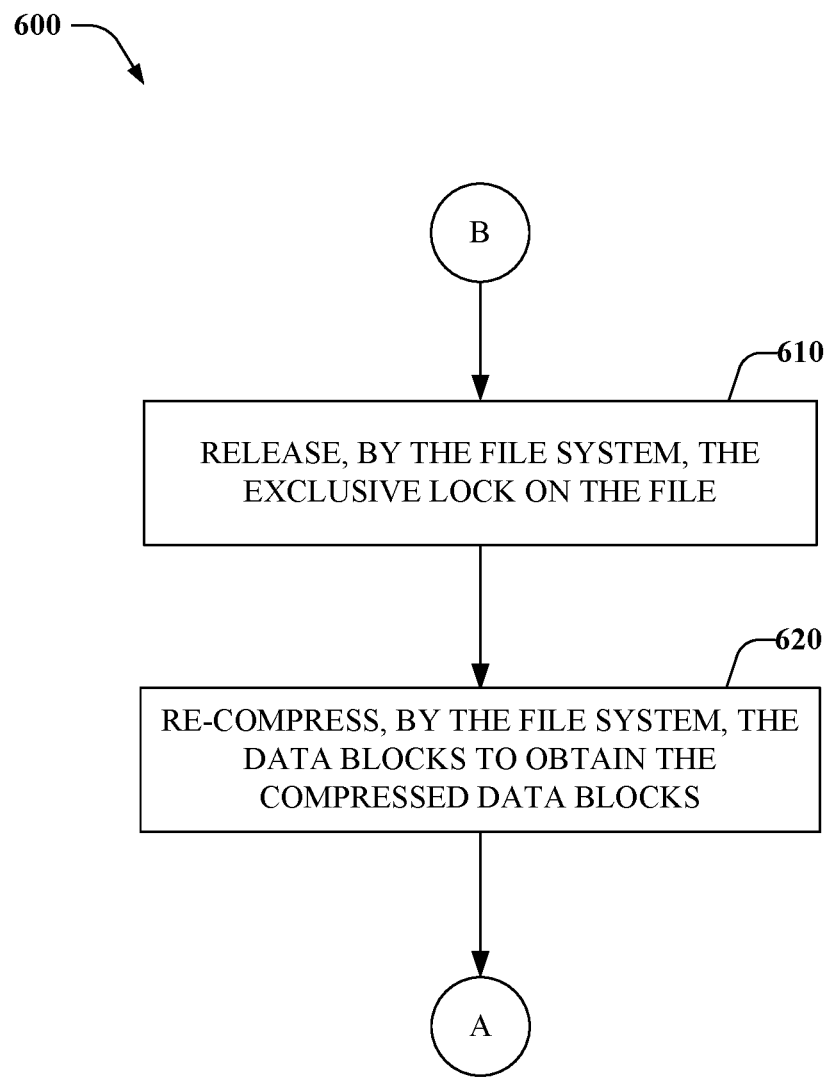
Figure 7:
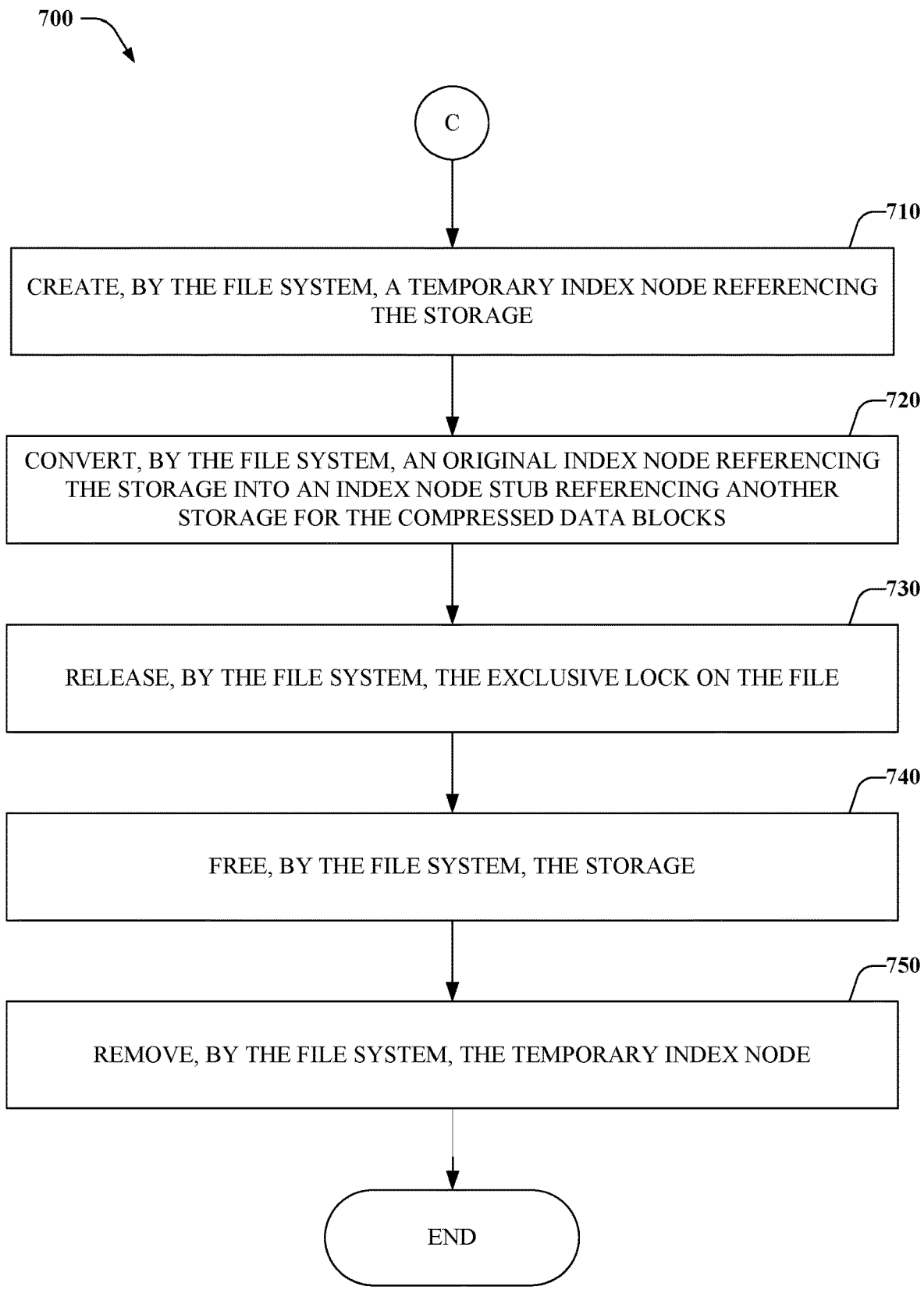
Figure 8:
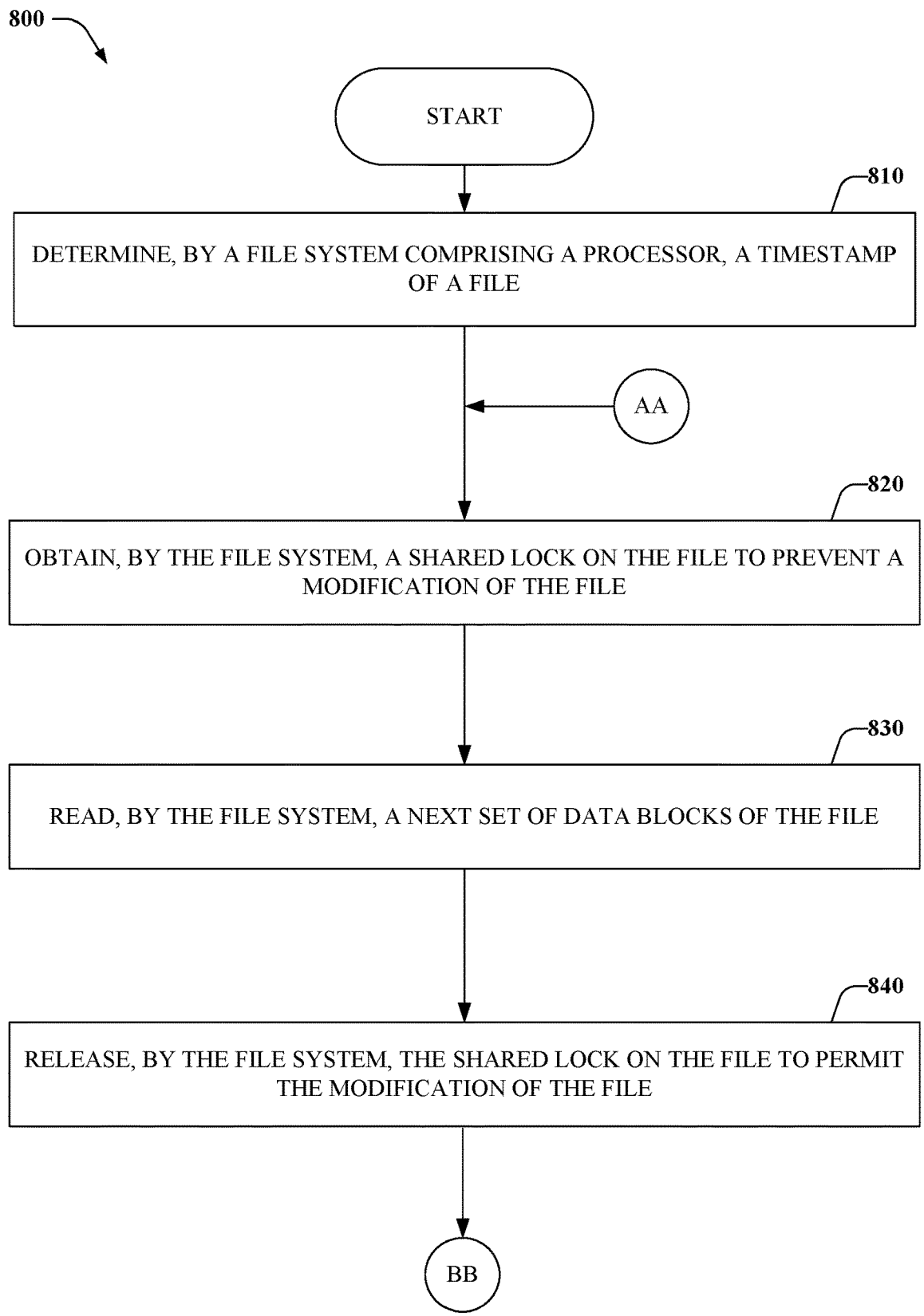
FIGS. 8-11 illustrate flow charts of another method associated with a file system for performing snapshot conscious internal file modification, in accordance with various embodiments.
Figure 9:
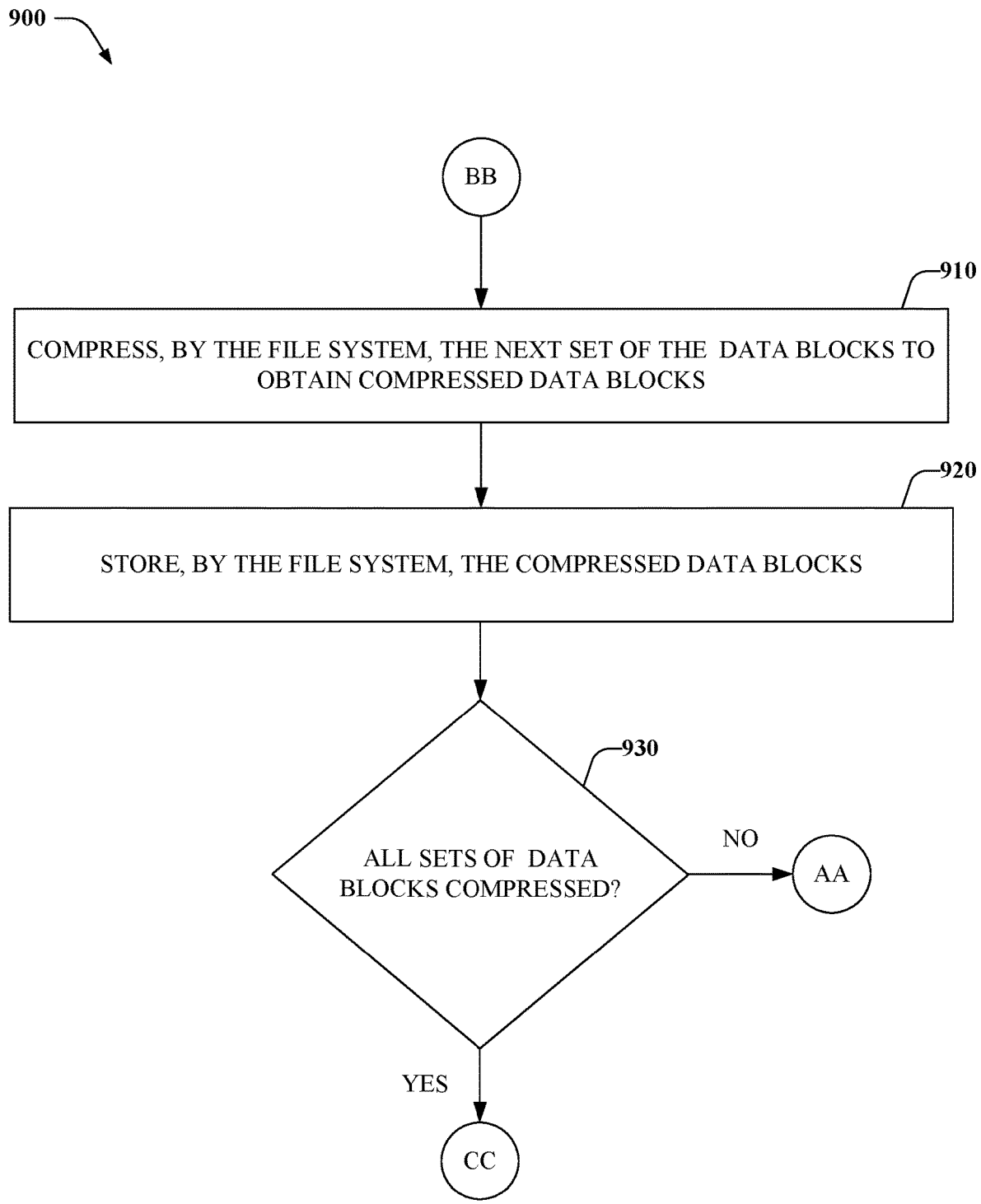
Figure 10:
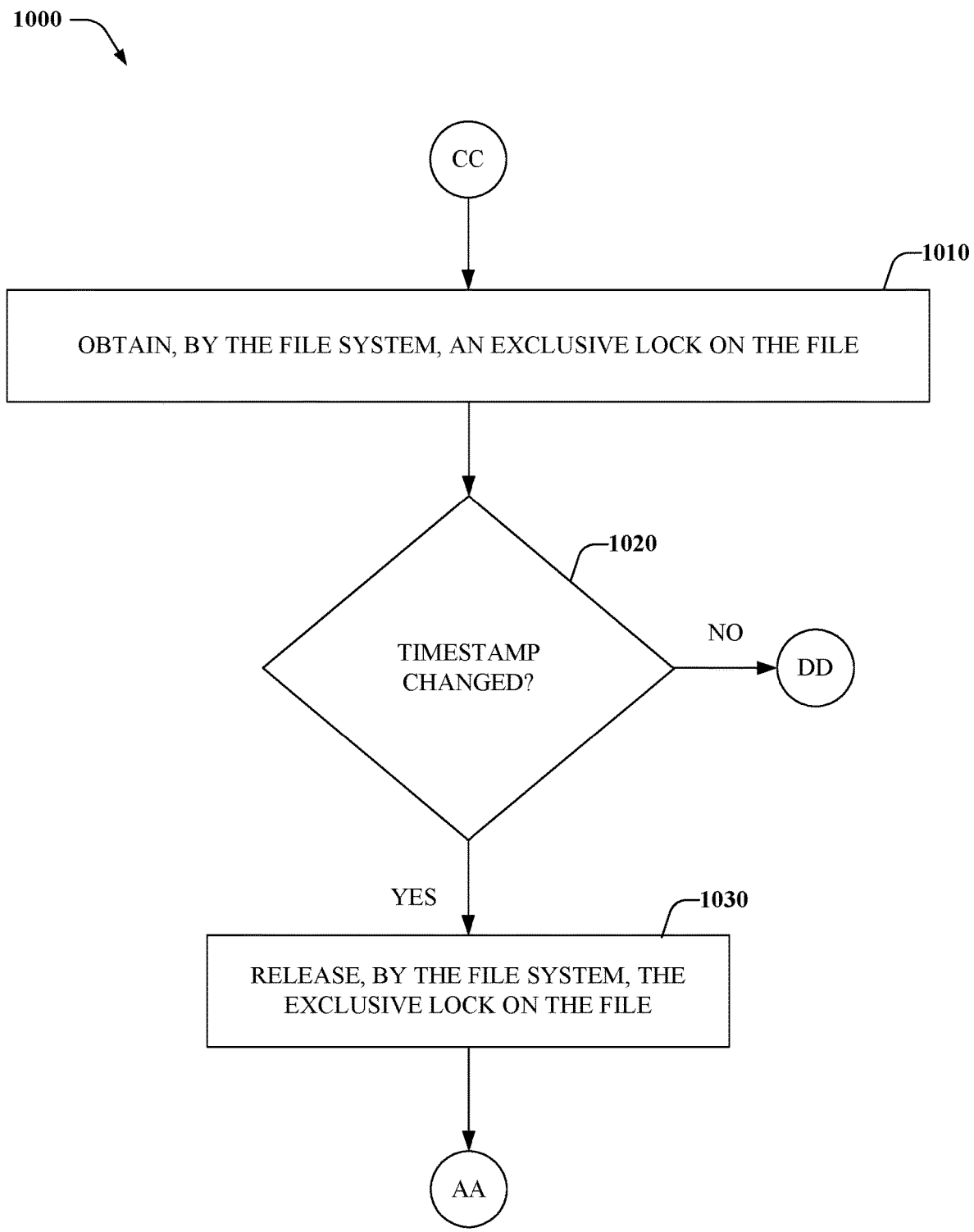
Figure 11:
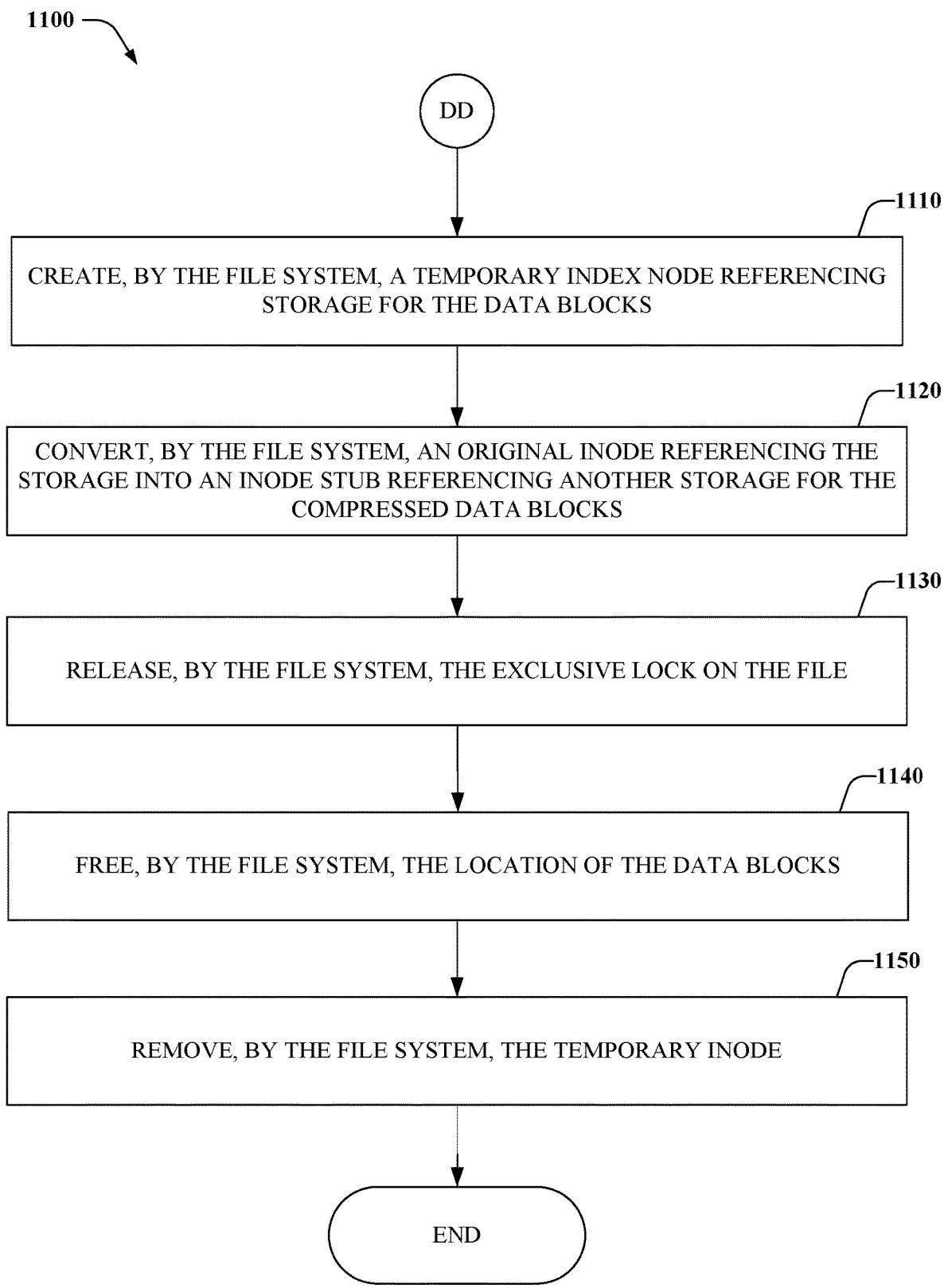

Referring now to FIGS. 5-7, processes 500-700 performed by file system 110 are illustrated, in accordance with various embodiments. At 510, a timestamp of a file of file system 110 can be determined. At 520, data blocks of the file can be iteratively compressed to generate compressed data blocks. At 530, an exclusive lock can be acquired, obtained, etc. on the file to prevent access, modification, etc. of the file by another process. At 540, it can be determined whether the timestamp has changed.

In this regard, if it has been determined, at 540, that the timestamp has changed, flow continues to 610, at which the exclusive lock on the file can be released. At 620, the data blocks can be re-compressed to obtain the compressed data blocks, and flow returns to 530.

If it has been determined, at 540, that the timestamp has not changed, flow continues to 710, at which a temporary index node, temporary inode, etc. that references the storage can be created. At 720, an original index node, inode, etc. referencing the storage can be converted into an index node stub, inode stub, etc. referencing another storage for the compressed data blocks.

At 730, the exclusive lock on the file can be released. At 740, the storage can be freed, released, etc. At 750, the temporary index node, temporary inode, etc. can be removed, deleted, etc.

FIGS. 8-11 illustrate processes 800-1100 performed by file system 110, in accordance with various embodiments. At 810, a timestamp of a file can be determined. At 820 a shared lock on the file can be obtained to prevent a modification, write, etc. of the file, data blocks of the file, etc. At 830, a set, next set, etc. of the data blocks can be read, e.g., during the shared lock. At 840, the shared lock on the file can be released, e.g., to permit the modification, write, etc. of the file.

Flow continues from 840 to 910, at which the set, next set, etc. of the data blocks can be compressed to obtain compressed data blocks, a set of compressed data blocks, etc. At 920, the compressed data blocks, set of compressed data blocks, etc. can be stored in a compressed data repository, data storage device, etc. (e.g., compressed data 220). At 930, it can be determined whether all sets of data blocks of the file have been compressed. In this regard, if it is determined that all sets of data blocks of the file have not been compressed, flow returns to 820; otherwise flow continues to 1010, at which an exclusive lock on the file can be obtained. At 1020, it can be determined whether the timestamp of the file has changed, e.g., while the sets of data blocks of the file have been compressed. In this regard, if it has been determined that the timestamp of the file has changed, flow continues to 1030, at which the exclusive lock on the file is released, and flow returns to 820.

On the other hand, if it has been determined that the timestamp of the file has not changed, flow continues from 1020 to 1110, at which a temporary index node referencing storage for the data blocks can be created. At 1120, an original inode referencing the storage can be converted into an inode stub referencing another storage for the compressed data blocks. At 1130, the exclusive lock on the file can be released. At 1140, the storage can be freed. At 1150, the temporary inode can be removed, deleted, etc.

In one embodiment (not shown), process 1100 can not include the temporary index node in a directory tree (not shown) of file system 110. In this regard, the temporary index node, and the data blocks of the file that have been referenced by the temporary index node, are not governed by a snapshot.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium", and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in non-volatile memory 1222 (see below), disk storage 1224 (see below), and/or memory storage 1246 (see below). Further, nonvolatile memory can be included in read only memory (ROM), programmable ROM (PROM), electrically programmable ROM (EPROM), electrically erasable ROM (EEPROM), or flash memory. Volatile memory 1220 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 12:
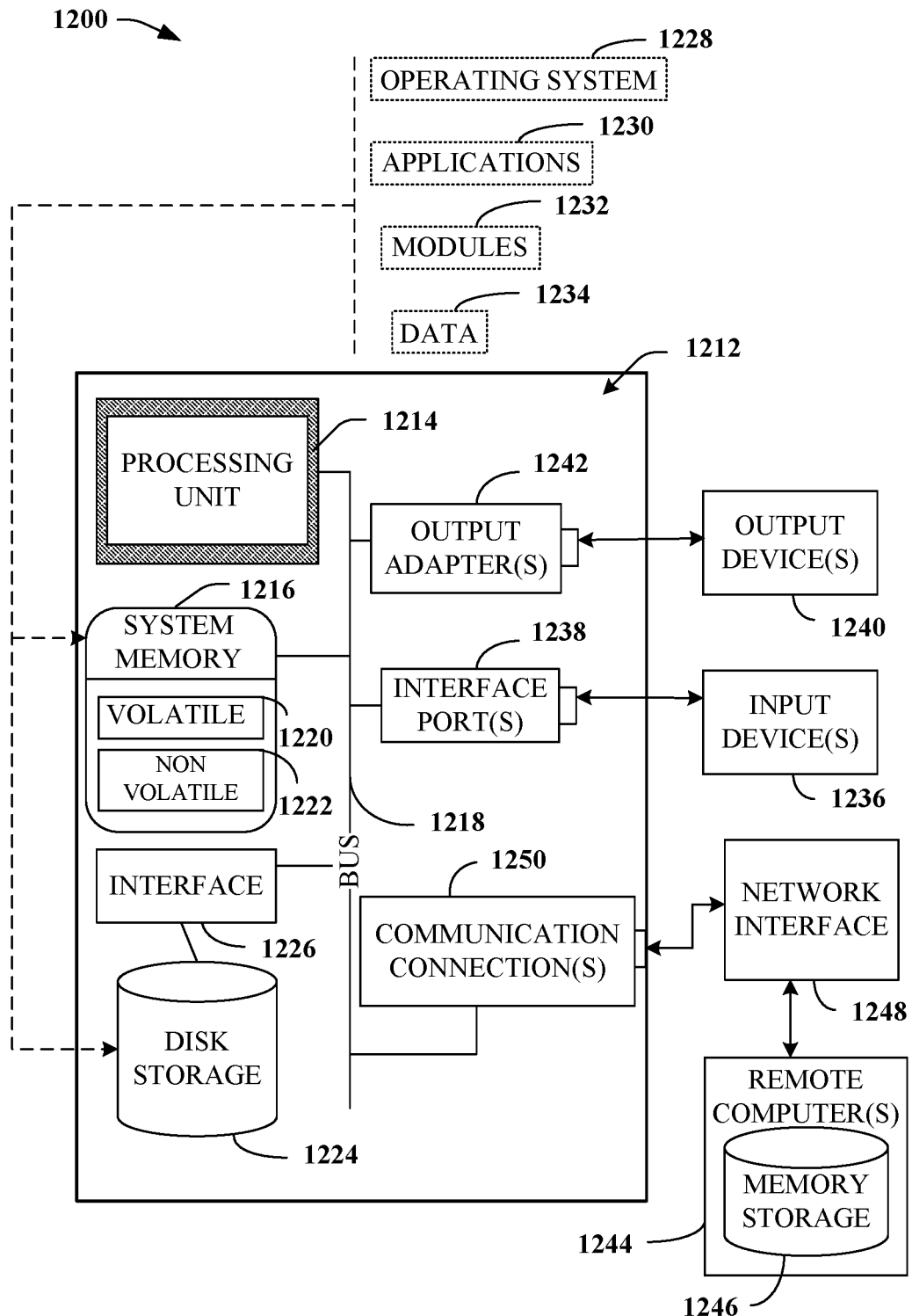
FIG. 12 is a block diagram representing an illustrative non-limiting computing system or operating environment in which one or more aspects of various embodiments described herein can be implemented.

In order to provide a context for the various aspects of the disclosed subject matter, FIG. 12, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 12, a block diagram of a computing system 1200 operable to execute the disclosed systems and methods is illustrated, in accordance with an embodiment. Computer 1212 comprises a processing unit 1214, a system memory 1216, and a system bus 1218. System bus 1218 couples system components comprising, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1216 comprises volatile memory 1220 and nonvolatile memory 1222. A basic input/output system (BIOS), containing routines to transfer information between elements within computer 1212, such as during start-up, can be stored in nonvolatile memory 1222. By way of illustration, and not limitation, nonvolatile memory 1222 can comprise ROM, PROM, EPROM, EEPROM, or flash memory. Volatile memory 1220 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also comprises removable/non-removable, volatile/non-volatile computer storage media. FIG. 12 illustrates, for example, disk storage 1224. Disk storage 1224 comprises, but is not limited to, devices like a magnetic disk drive, floppy disk drive, tape drive, Jaz drive, Zip drive, LS-100 drive, flash memory card, or memory stick. In addition, disk storage 1224 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226.

It is to be appreciated that FIG. 12 describes software that acts as an intermediary between users and computer resources described in suitable operating environment 1200. Such software comprises an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be appreciated that the disclosed subject matter can be implemented with various operating systems or combinations of operating systems.

A user can enter commands or information into computer 1212 through input device(s) 1236. Input devices 1236 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1214 through system bus 1218 via interface port(s) 1238. Interface port(s) 1238 comprise, for example, a serial port, a parallel port, a game port, a universal serial bus (USB), a wireless based port, e.g., Wi-Fi, Bluetooth, etc. Output device(s) 1240 use some of the same type of ports as input device(s) 1236.

Thus, for example, a USB port can be used to provide input to computer 1212 and to output information from computer 1212 to an output device 1240. Output adapter 1242 is provided to illustrate that there are some output devices 1240, like display devices, light projection devices, monitors, speakers, and printers, among other output devices 1240, which use special adapters. Output adapters 1242 comprise, by way of illustration and not limitation, video and sound devices, cards, etc. that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, a workstation, a microprocessor based appliance, a peer device, or other common network node and the like, and typically comprises many or all of the elements described relative to computer 1212.

For purposes of brevity, only a memory storage device 1246 is illustrated with remote computer(s) 1244. Remote computer(s) 1244 is logically connected to computer 1212 through a network interface 1248 and then physically and/or wirelessly connected via communication connection 1250. Network interface 1248 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can comprise, for example, internal and external technologies such as modems, comprising regular telephone grade modems, cable modems and DSL modems, wireless modems, ISDN adapters, and Ethernet cards.

The computer 1212 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1212 can connect to other devices/networks by way of antenna, port, network interface adaptor, wireless access point, modem, and/or the like.

The computer 1212 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed.

While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A file system, comprising:
a processor, coupled to a memory, that executes or facilitates execution of executable components, comprising
compressing or archiving first stored data that has been stored in a first data storage format and that has been referenced by an original inode to obtain compressed data or archived data, wherein the compressed data or the archived data is to be stored, in a second data storage format that is different from the first data storage format, as second stored data; and
preventing a storage copy of the first stored data that has been stored in the first data storage format from being created for servicing of a snapshot comprising a point-in-time copy of the file, the preventing comprising
generating a temporary inode that references the first stored data that has been stored in the first data storage format, wherein the temporary inode is not associated with a directory tree of the file system,
converting, via a change of a bit value, the original inode referencing the first stored data that has been stored in the first data storage format into an inode stub referencing the second stored data that has been stored in the second data storage format,
freeing the first stored data, the freeing comprising deleting the first stored data, and
in response to the first stored data being deleted, removing, from the file system, the temporary inode referencing the first stored data.

2. The file system of claim 1, wherein the compressing comprises:
determining a timestamp of a file corresponding to the first stored data and representing a time that the file was last modified,
after the determining, iteratively compressing the first stored data for a subset of data blocks of the file to obtain the compressed data, and
after the iteratively compressing, obtaining an exclusive lock on the file to prevent access of the file by another process.

3. The file system of claim 2, wherein the operations further comprise:
in response to determining, after the obtaining the exclusive lock on the file, that the timestamp of the file has not changed, generating the temporary inode.

4. The file system of claim 3, wherein the operations further comprise:

releasing, after the converting, the exclusive lock on the file.

5. The file system of claim 4, wherein the removing further comprises:
in response to the releasing the exclusive lock, removing the temporary inode, wherein the temporary inode and the first stored data are not governed by the snapshot after the freeing.

6. The file system of claim 2, wherein the compressing further comprises:
in response to determining that the timestamp satisfies a defined condition with respect to the time that the file was last modified, selecting the file for compression.

7. The file system of claim 1, wherein the comprising further comprises:
obtaining a shared lock on the file to prevent a write of data to the file;
reading a first set of data blocks of the file;
releasing the shared lock on the file to permit the write of the data to the file;
compressing the first set of the data blocks to obtain a second set of the compressed data; and
storing the second set of the compressed data as the second stored data.

8. The file system of claim 2, wherein the operations further comprise:
in response to determining, after the obtaining the exclusive lock on the file, that the timestamp of the file has changed, releasing the exclusive lock on the file, and re-compressing the first stored data to re-generate the compressed data.

9. A method, comprising:
compressing, by a file system comprising a processor, uncompressed data comprising a first data storage format and being referenced by an original index node to obtain compressed data comprising a second data storage format that is different from the first data storage format; and
in response to the compressing, preventing, by the file system, an uncompressed storage copy of the uncompressed data comprising the first data storage format from being created for servicing of a snapshot that comprises a point-in-time copy of the file system, the preventing comprising
generating, by the file system, a temporary index node that references the uncompressed data and that is not associated with a directory tree of the file system,
converting, by the file system via a change of a bit value, the original index node that references the uncompressed data into an index node stub that references, via a root address of a b-tree of the file system, block addresses of the compressed data comprising the second data storage format,
freeing the uncompressed data, and
in response to the uncompressed data being freed, deleting, by the file system, the temporary index node referencing the uncompressed data.

10. The method of claim 9, wherein the compressed data comprises compressed data blocks, and wherein the compressing comprises:
determining a timestamp representing a time that the file was last modified,
in response to the determining of the timestamp, compressing the data blocks to obtain the compressed data blocks, and in response to the compressing the data blocks, acquiring an exclusive lock on the file for preventing access of the file by another process.

11. The method of claim 10, further comprising
in response to the acquiring the exclusive lock, and in response to determining that the timestamp has not changed, creating, by the file system, the temporary index node referencing the uncompressed data.

12. The method of claim 11, further comprising:
in response to the converting the original index node into the index node stub, releasing, by the file system, the exclusive lock on the file.

13. The method of claim 12, wherein the freeing further comprises:
in response to the releasing the exclusive lock on the file, deleting the temporary index node and freeing the uncompressed data.

14. The method of claim 10, wherein the compressing the data blocks comprises:
obtaining a shared lock on the file to prevent a modification of the data blocks,
in response to the obtaining the shared lock, reading a first set of the data blocks,
in response to the reading the first set of the data blocks, releasing the shared lock on the file to permit the modification of the data blocks of the file,
in response to the releasing the shared lock, compressing the first set of the data blocks to obtain a second set of the compressed data blocks, and
storing the second set of the compressed data blocks in at least a portion of the compressed data.

15. The method of claim 10, further comprising:
in response to determining that the timestamp has changed, releasing, by the file system, the exclusive lock and re-compressing the data blocks.

16. A non-transitory computer-readable device having stored thereon executable instructions that, in response to execution, cause a device comprising a processor to perform operations, the operations comprising:
archiving pre-archived data comprising a first storage format and being referenced by an original inode comprising a first root address of a first b-tree referencing block addresses of the pre-archived data and comprising a group of data blocks of a file of a file system to obtain archived data comprising a second storage format that is different from the first storage format; and
preventing a pre-archived storage copy of the pre-archived data from being created for servicing of a snapshot while creating an archived storage copy of the archived data for the servicing of the snapshot, comprising
generating a temporary inode that references the pre-archived data comprising the first storage format, wherein the temporary inode has been excluded from a directory tree of the file system,
converting the original inode referencing the pre-archived data into an inode stub referencing the archived data comprising the second storage format, the inode stub comprising a second root address of a second b-tree referencing block addresses of the archived data,
deleting the pre-archived data, and
in response to the pre-archived data being deleted, removing the temporary inode.

17. The non-transitory computer-readable device of claim 16, wherein the archiving the pre-archived data comprises:

determining a timestamp of the file, in response to the determining the timestamp, archiving the pre-archived data, and in response to the archiving, obtaining an exclusive lock on the file to prevent an access of the file by another process.

18. The non-transitory computer-readable device of claim 17, wherein the operations further comprise:

in response to the obtaining the exclusive lock on the file, and in response to determining that the timestamp has not changed, creating the temporary inode referencing the pre-archived data.

19. The non-transitory computer-readable device of claim 18, wherein the removing the temporary inode comprises:

in response to the converting the original inode into the inode stub, releasing the exclusive lock on the file, and in response to the releasing of the exclusive lock, removing the temporary inode and freeing the pre-archived data.

20. The non-transitory computer-readable device of claim 17, wherein the archiving further comprises:

in response to determining that the timestamp satisfies a defined condition with respect to a time that the file was last modified, selecting the file for the archiving.

\* \* \* \* \*